(12) United States Patent
Wachinger et al.

(10) Patent No.: US 10,690,639 B2
(45) Date of Patent: Jun. 23, 2020

(54) LIQUID CHROMATOGRAPHY SYSTEM FOR SAMPLE LOADING WITH A TRAP COLUMN

(71) Applicant: DIONEX SOFTRON GMBH, Germering (DE)

(72) Inventors: Thomas Wachinger, Altomuenster (DE); Christoph Hollnagel, Gauting (DE)

(73) Assignee: Dionex Softron GMBH, Gemering (DE)

(*) Notice: Subject to any disclaimer, the term of this patent is extended or adjusted under 35 U.S.C. 154(b) by 256 days.

(21) Appl. No.: 15/809,239

(22) Filed: Nov. 10, 2017

(65) Prior Publication Data
US 2018/0128792 A1 May 10, 2018

(30) Foreign Application Priority Data

Nov. 10, 2016 (DE) .................. 10 2016 121 516

(51) Int. Cl.
*G01N 30/60* (2006.01)
*G01N 30/14* (2006.01)
*G01N 30/24* (2006.01)
*G01N 30/20* (2006.01)
*G01N 30/02* (2006.01)
*G01N 30/38* (2006.01)

(52) U.S. Cl.
CPC ......... *G01N 30/6034* (2013.01); *G01N 30/14* (2013.01); *G01N 30/20* (2013.01); *G01N 30/24* (2013.01); *G01N 2030/027* (2013.01); *G01N 2030/201* (2013.01); *G01N 2030/202* (2013.01); *G01N 2030/385* (2013.01)

(58) Field of Classification Search
CPC .... G01N 30/6034; G01N 30/14; G01N 30/20; G01N 30/24; G01N 2030/027; G01N 2030/202; G01N 2030/385
USPC ......................................................... 73/61.53
See application file for complete search history.

(56) References Cited

U.S. PATENT DOCUMENTS 8,677,808 B2 * 3/2014 Ozbal .................... G01N 30/24
73/61.55
8,806,922 B2 8/2014 Hochgraeber
(Continued)

FOREIGN PATENT DOCUMENTS

CN 101529243 A 9/2009
CN 101617226 A 12/2009
(Continued)

*Primary Examiner* — Natalie Huls
*Assistant Examiner* — Monica S Young
(74) *Attorney, Agent, or Firm* — Timothy J. Ohara

(57) ABSTRACT

A liquid chromatography system includes a separation column, a trap column, and a first switching valve. The first switching valve is adapted to assume a first switching position for bringing a sample into the trap column in a first flow direction. The switching valve is also adapted to assume a second switching position for fluidly connecting the trap column with the separation column and providing a flow from the trap column to the separation column in a second flow direction. The second flow direction is opposite to the first flow direction. The first switching valve is adapted to assume a third switching position for fluidly connecting the trap column, with the separation column and providing a flow from the trap column to the separation column in the first flow direction.

15 Claims, 6 Drawing Sheets

(56) References Cited

U.S. PATENT DOCUMENTS

| | | | | |
|---|---|---|---|---|
| 2006/0219638 A1* | 10/2006 | Watanabe | ............ | G01N 30/463 210/656 |
| 2007/0251302 A1* | 11/2007 | Iwata | ..................... | G01N 30/20 73/61.56 |
| 2010/0032604 A1* | 2/2010 | Wilen | ................... | F16K 11/074 251/304 |
| 2012/0132013 A1* | 5/2012 | Glatz | ..................... | G01N 30/20 73/863.02 |
| 2014/0306105 A1* | 10/2014 | Netto | ..................... | H01J 49/26 250/282 |
| 2016/0238573 A1 | 8/2016 | Venkatramani et al. | | |
| 2019/0120800 A1* | 4/2019 | Cormier | ................. | G01N 30/20 |

FOREIGN PATENT DOCUMENTS

| | | |
|---|---|---|
| CN | 102460145 A | 5/2012 |
| CN | 102734546 A | 10/2012 |
| CN | 104458953 A | 3/2015 |
| CN | 104678015 A | 6/2015 |
| CN | 105308448 A | 2/2016 |
| DE | 102014219712 A1 | 3/2016 |
| EP | 0553054 A2 | 7/1993 |

* cited by examiner

LIQUID CHROMATOGRAPHY SYSTEM FOR SAMPLE LOADING WITH A TRAP COLUMN

CROSS-REFERENCE TO RELATED APPLICATION

This application claims the priority benefit under 35 U.S.C. § 119 to German Patent Application No. DE 10 2016 121 516.3, filed on Nov. 10, 2016, the disclosure of which is incorporated herein by reference.

FIELD OF THE INVENTION

The invention relates to sample loading, particularly in High Performance Liquid Chromatography (HPLC). More precisely, the invention relates to flexible sample loading with a trap column.

BACKGROUND

In High Performance Liquid Chromatography (HPLC), a sample to be analyzed is passed through a chromatography column (also referred to as separation or analytical column) to be separated into its constituent parts. The sample separation is generally performed in the separation or analytical column (also called separation column) at high pressure, such as at least 400 bar, more preferably 400-1500 bar, or even exceeding 1500 bar. The sample is pushed through the separation column by a pump. During the sample movement through the column, its individual constituents interact differently with the material packed in the column (usually granular material). In this way, different sample constituents move through the separation column at different speeds and can be separately measured. Before reaching the separation column, the sample must generally be introduced into a liquid chromatography system from a sample reservoir.

Sample retrieval and loading can be done in many ways depending on the exact application and type of analysis being done. The sample can be introduced into the system by a sample pick up means (sometimes needle or sipper) via a pressure difference. The sample can first be stored in a sample loop.

U.S. Pat. No. 8,677,808 B2 discloses, in one embodiment, a sample injection system including a vacuum source, a conduit in communication with the vacuum source, a fluid sensor configured to detect the presence of the fluid in the conduit, a sample loop in communication with the conduit; and a sipper in communication with the sample loop.

U.S. Pat. No. 8,806,922 B2 discloses a sample injector for liquid chromatography including an injection valve having a waste port, two sample loop ports, and two high-pressure ports. One high-pressure port can be connected to a pump and the other high-pressure port can be connected to a chromatography column. A sample loop is connected to one of the sample loop ports on one end and to a pump volume of a sample conveying device on the other end. A section of the sample loop can be separated to facilitate receiving a sample fluid in the sample loop. A control unit controls the injection valve and the sample conveying device. The sample injector allows a sample to be loaded into the sample loop and then pressurized to an operating pressure prior to injecting the sample into the chromatography column. The sample loop may also be isolated from the operating pressure for facilitating depressurization of the loop.

Liquid chromatography systems often comprise one or more valves for connecting the components of the system in different ways. Such valves can for example comprise "ports" and "grooves". A component of the system can be fluidly connected to a particular port. Grooves can be used to connect two ports with each other.

In some liquid chromatography systems, a trap column is used as a means to clean, pre-filter and/or concentrate the sample before injection into the separation column. In such embodiments the sample loop may or may not be present. The trap column can be arranged upstream of the separation column. The sample is then retrieved via a sample pick up means and brought either into a sample loop and then to the trap column, or directly to the trap column. After the trap column is disconnected from the analytical flow (that is, the flow from the solvent pump to the separation column), the sample can be guided directly into the trap column (that is, it can be "trapped") by means of another conveying device and an appropriate solvent.

SUMMARY

The trap column usually comprises packing that interacts differently with different sample constituents. Some constituents get stuck to the packing and remain within the trap column, while others can pass through it to waste. Some components remain at the entrance of the trap column, which means that the sample gets pre-filtered when passing through the trap column. The trap column can then let all the undesirable sample parts through its packing, so that they can be guided into waste. In this way, only the parts of the sample intended for analysis remain in the trap column. After concentrating the sample, the constituents stuck to the trap column can get washed off by a solvent to be brought into the separation column. Before that, the trap column can optionally be pre-compressed to the separation column pressure to avoid pressure surges that can contribute to sample dispersion and reduce the lifetime of the column. Bringing the sample to the separation column can be performed by flushing the solvent through the trap column in the same direction that the sample was brought into it, known as "forward flushing", or by reversing the flow direction and flushing the solvent in the opposite direction from the one the sample was brought in, known as "back flushing" (also "backward flushing"). In other words, say the sample is brought into the "entrance" of the trap column. When using forward flushing, the sample passes though the length of the column and emerges on the other side of it or at the exit of the trap column. When using back flushing, the sample is brought out of the trap column through the same side it entered, or the entrance of the trap column.

Forward flushing and back flushing can be used for different types of liquid chromatography analyses. For example, forward flushing can yield a more "pure" sample, as it travels through the whole length of the trap column and gets filtered extensively. Undesirable parts of the sample can remain at the entrance of the trap column, so that the sample is pre-filtered and the separation column is protected. In other words, coarse impurities are filtered out at the entrance of the trap column to clean the sample and to protect the analytical column. Such impurities remain at the entrance of the trap column and are not "washed" though the column during the analysis. The column packing works as an additional filter in this case, and the separation column is not contaminated, but this can lead to undesirable dispersions. Back flushing can yield a less dispersed sample, as passing through the whole trap column leads to dispersion. In the case of back flushing, the sample is brought directly to the separation column, so that a smaller sample dispersion occurs and the peak resolution of the sample is therefore optimized. This, however, can negatively affect the lifetime of the trap column, and therefore also reproducibility, as the column packing is exposed to variable stress. That is, depending on the quantity of the sample available, and/or on the type of analysis being done, it can be preferable to be able to switch between the two modes without dismantling or otherwise significantly modifying the liquid chromatography system. Forward and backward flush are known methods in the HPLC. Switching between the two methods has been previously done via hardware configuration, which has to be implemented by the user.

In light of the above, it is the object of the present invention to provide a liquid chromatography system and method allowing for easy switching between forward flushing and back flushing of the trap column without disassembling the system or changing its hardware configuration and without resorting to other compromises or accepting disadvantages.

These objects are met by the present invention. The present invention is specified in the claims as well as in the below description. Preferred embodiments are particularly specified in the dependent claims and the description of various embodiments.

In a first embodiment, the invention relates to a liquid chromatography system. The liquid chromatography system comprises a separation column, a trap column and a first switching valve. The first switching valve is adapted to assume a first switching position for bringing a sample into the trap column in a first flow direction. The first switching valve is further adapted to assume a second switching position for fluidly connecting the trap column with the separation column and providing a flow from the trap column to the separation column in a second flow direction. The second flow direction is opposite to the first flow direction. The first switching valve is also adapted to assume a third switching position for fluidly connecting the trap column with the separation column and providing a flow from the trap column to the separation column in the first flow direction.

In a second embodiment, the invention relates to a switching valve for changeably connecting components. The switching valve comprises a plurality of ports adapted to be directly fluidly connected to a component. The switching valve also comprises a plurality of connecting elements adapted to changeably directly fluidly connect ports to one another. The switching valve is further adapted to assume a first switching position, wherein a first port is directly fluidly connected to a second port. The switching valve is also adapted to assume a second switching position wherein the first port is directly fluidly connected to a third port. The switching valve is further adapted to assume a third switching position, wherein the first port is directly fluidly connected to a fourth port.

In a third embodiment, a method for sample loading is disclosed. The method comprises providing a first switching valve comprising at least three distinct switching positions, a trap column and a separation column. The method further comprises bringing a sample into the trap column in a first flow direction using a first switching position. The method also comprises connecting the trap column with the separation column and providing a flow from the trap column to the separation column. Said flow is provided in a second flow direction, which second flow direction is opposite to the first flow direction. Said connecting and providing the flow are done using a second switching position. The method further comprises connecting the trap column with the separation column and providing a flow from the trap column to the separation column in the first flow direction. Said connecting and providing the flow are done using a third switching position.

In a fourth embodiment, a use of the liquid chromatography system is provided. During said use, the first switching valve assumes a first switching position in which the sample is brought into the trap column in the first flow direction. In said use, the first switching valve assumers a second switching position in which the trap column is fluidly connected with the separation column and a flow is provided in a second flow direction. This second flow direction is opposite to the first flow direction. During said use, the first switching valve assumes a third switching position in which the trap column is fluidly connected with the separation column. A flow is then provided in the first flow direction.

The present invention provides a possibility to switch between backward flush and forward flush of the trap column without changing the configuration of the HPLC system and without resorting to other compromises or accepting disadvantages. Thus, both backward flush and forward flush may be performed with one system and one may switch fast between forward flush and backward flush. This provides the user with a more versatile system. In other words, the valve switching mechanism allows a forward flush and a backward flush in the trap column without hardware changes. At the same time, no chromatographic disadvantages or compromises arise and the overall system is improved. Further advantages of the present invention may include a higher flexibility achieved by a simple switching between forward and backward flush without hardware changes.

Note that "switching positions" refer herein to positions in which the switching valve is adapted to fluidly connect various components of the HPLC system in distinct ways. That is, switching positions correspond to certain arrangements of connecting elements or grooves connecting certain ports to each other. Manually or automatically changing the port to which a certain system component is connected does not constitute changing of a switching position. Instead, switching from one switching position to another is done solely by means of the switching valve. However, rotating the arrangement of connecting elements or grooves so that they now fluidly connect a different configuration of ports does constitute changing of a switching position. In other words, switching of switching position refers to changing the connection of system components without reconfiguring which port connects directly to which element. However, a switching position is independent of which particular connection elements are used to achieve it. For example, consider a switching position in which the trap column is fluidly connected with the separation column. Connecting the trap column with the separation column via a different connecting element would constitute the same switching position, provided the flow direction is maintained. However, changing the ports to which the trap column or the separation column are connected to achieve a different configuration or flow direction would not constitute a different switching position. That is, switching position refers to a rotation independent position characterized entirely by the system components connected with each other in a certain configuration. Further, a switching position can comprise one or more ports not connected to anything, or leading to dead ends. That is, in such an arrangement, one or more ports can be not aligned with any connecting element. A switching position comprising an intermediate arrangement of a connecting element is also possible. That is, an intermediate arrangement can comprise one or more connecting elements aligned with one port rather than connecting two ports with each other.

It will be understood that the sample may be a liquid sample. As will further be understood, when the sample is introduced into the trap column, some constituents of the sample will adhere to the trap column while other constituents may not adhere and may flow through the trap column and go to waste (which may also be referred to as a waste reservoir). That is, the sample being introduced and adhering to the trap column does not necessarily have exactly the same composition as the original sample. The same applies to the sample which is supplied from the trap column to the separation column. E.g., depending on the type of solvent used, only some constituents of the sample adhering to the trap column may be introduced to the separation column. For sake of brevity and simplicity of description, however, all of the above will simply be referred to as "the sample"
although it is clear to the skilled person that the sample originally introduced into a system carrying out the described method does not necessarily correspond to 100% to the sample that is supplied to the separation column and subsequently analyzed.

Generally speaking, in other words, the invention provides an injection or switching valve comprising a special design suitable to interconnect chromatographic components at the ports. The particular design may in particular be realized by a particular stator and rotor design.

In some preferred embodiments, the first switching valve can comprise a plurality of ports and a plurality of connecting elements for changeably connecting the ports of the first switching valve. This can be particularly advantageous, as typically various system components such as columns or pumps are fixedly connected to ports, and switching the port to which a component is connected requires disassembling the device. The connecting elements allow different interconnections of ports, therefore allowing the components fixedly attached to their ports to be connected with each other in different configurations. The system can then assume different configurations without having to be disassembled, and the possible uses of the system are increased. This may lead to increased flexibility in system operation, time saving and the reduction of required components, overall increasing efficiency.

In some embodiments, the first switching valve comprises at least four ports and at least two connecting elements. In preferred embodiments, the first switching valve can comprise at least six ports and at least three connecting elements. As described above, having multiple ports for fixedly attaching multiple system components is advantageous. It is particularly advantageous to be able to connect said ports to each other in different ways. Therefore, the having multiple ports such as four, five or six allows for multiple components to be fixedly attached to them, increasing the range of manoeuvre of the system. Further, having multiple connecting elements such as two or three or four further increases this range, allowing for multiple combinations of ports interconnection. However, increased number of ports and connecting elements increases the complexity of valve manufacturing and setup, as well as increasing possibilities for defects, leaks and dead volumes. Therefore, it is advantageous to also limit the number of ports and/or connecting elements in a reasonable manner. In light of this, it has been seen to be particularly advantageous to manufacture and use a valve with five to six ports and with three connecting elements.

In some preferred embodiments, one port of the first switching valve is adapted to be directly fluidly connected to at least three other ports of the first switching valve. That is, the system component connected to this port can be adapted to be directly fluidly connected with at least three other distinct system elements. As discussed above, flexibility in port interconnection is a particularly advantageous function of the present invention. The possibility of connecting a given port to three other distinct ports leads to a significant increase in the way the system can operate. For example, as discussed below, it allows for the fluid within the system to flow in two opposite directions simply by switching a valve configuration, that is, assuming a different switching position of the valve. This can be achieved by fixedly attaching an analytical pump to the port of the pump adapted to be directly fluidly connected with at least three other ports of the valve.

In some preferred embodiments, the system further comprises an analytical pump adapted to generate or provide an analytical flow in the system. In some such embodiments, the system further comprises a pump solvent reservoir adapted to supply the analytical pump with solvent for the analytical flow. Such a reservoir may be adapted to be emptied and/or exchanged with another reservoir easily. In some embodiments, the system also comprises a solvent selector valve adapted to switch between a pump solvent reservoir and a cleaning solution. This can be used when the pump is cleaned, but is not a necessary feature of the system.

In some preferred embodiments, the system further comprises a metering device adapted to bring the sample into the trap column in a first switching position. That is, the metering device can be placed in such a way that it is able to generate negative pressure, drawing the sample into the trap column for trapping. The metering device can operate with a simple piston principle, but can also comprise a more sophisticated device. Using the metering device to draw the sample into the trap column saves the need to use an additional pump other than the analytical pump for this purpose.

In some preferred embodiments, the system further comprises a sample pick up means adapted to retrieve the sample and a seat adapted to receive the sample pick up means. In some embodiments, the sample pick up means can comprise a needle. In such embodiments, the seat can comprise a needle seat. The sample pick up means can be adapted to move from the seat to the sample reservoir to retrieve the sample and bring it into the system. This can, for example, be done by using the metering device to generate negative pressure to draw the sample into the sample pick up means.

In some preferred embodiments the system comprises a plurality of ports and connecting elements, an analytical pump, a metering device and a sample pick up means with a seat. In such embodiments, the first switching position of the first switching valve can be characterized by the following arrangement. The sample pick up means can be located in the seat fluidly connected with the trap column via two ports and one connecting element. That is, the seat can be fixedly connected to one port, the trap column to another, and these two ports can be fluidly connected to each other via the connecting element. The metering device can be connected with the sample pick up means via tubing. That is, with the sample pick up means in the seat, the metering device can be directly fluidly connected with the trap column. The analytical pump can be fluidly connected with the separation column via two ports and one connecting element (as described above). This first switching position is particularly advantageous, as it can allow first for sample retrieval and then for sample injection into the trap column without switching the valve configuration. The sample pick up means can first leave the seat and travel to a sample reservoir. Then, the metering device can create negative pressure, drawing the sample into the sample pick up means. The sample pick up means can then travel back to the seat. The metering device can then generate positive pressure, pushing the sample into the trap column in a first flow direction and passing through a first end of the trap column. Both sample retrieval and sample trapping can be done by the metering device in the first switching position.

In some preferred embodiments, the system comprises a plurality of ports and a plurality of connecting elements to interchangeably connect the ports, as well as the analytical pump. In such embodiments, the second switching position of the first switching valve can be characterized by the following arrangement. The analytical pump can be fluidly connected with the trap column via two ports and one connecting element. Again, this means that the analytical pump is fixedly attached to one port, the trap column is fixedly attached to another port, and these two ports are fluidly directly connected to each other by a connecting element. The separation column can be fluidly connected with the trap column via two ports and one connecting element. As above, this refers to the trap column being fixedly attached to a port and the separation column being fixedly attached to another port, with these two ports connected by a connecting element. Note, that the trap column can comprise two ends in such embodiments, and be fixedly attached to two distinct ports via those two ends. That is, a first end of the trap column can be fixedly attached to one port that is fluidly connected with the port to which the separation column is fixedly attached, and, a second end of the trap column can be fixedly attached to another port that is fluidly connected with the port to which the analytical pump is fixedly attached. Therefore, in such embodiments and in such a configuration, the analytical pump is fluidly connected with the separation column via the trap column. The analytical pump can further generate flow from the trap column to the separation column in the first flow direction. That is, the flow can be such that it is directed from the second end of the trap column towards the first end of the trap column. Referring to the above description of the first switching position, a skilled person will note that the flow direction in the trap column is opposite in the second switching position. This can be referred to as "backflush" or "back flushing". That is, the sample, or, at least the constituents of the sample that do not get filtered by the trap column, leaves the trap column in the direction opposite to the one it was brought in at. This can be particularly advantageous, as the sample need not be dissipated by passing through the length of the trap column and remains concentrated. Therefore, a smaller amount of sample can be sufficient for testing. However, it can also be disadvantageous, as the sample does not necessarily get filtered by the full length of the trap column. Further, some constituents of the sample can get stuck at the entrance of at the first end of the trap column when the sample is brought in for trapping. During back flushing, those constituents can get mixed back in with the sample. They can, potentially, contaminate the separation column. Depending on the application at hand, the second switching position allowing for sample backflush can be particularly advantageous.

In some preferred embodiments, the system comprises a plurality of ports and a plurality of connecting elements to interchangeably connect the ports, as well as the analytical pump. In such embodiments, the third switching position of the first switching valve can be characterized by the following arrangement. The analytical pump is fluidly connected with the trap column via two ports and one connecting element. As discussed above, this refers to the analytical pump being fixedly attached to one port, the trap column, or, preferably one end of the trap column being fixedly attached to another port, and those two ports being fluidly connected by the connecting element. The separation column can be fluidly connected with the trap column (that is, preferably, with one end of the trap column). The analytical pump can generate flow from the trap column to the separation column in the second flow direction. Put differently, the port with the analytical pump can, in such embodiments, be directly fluidly connected to the port with the first end of the trap column. The port with the separation column can, in such embodiments, be directly fluidly connected to the port with the second end of the trap column. Referring to the description of the first switching position above, a skilled person will note, that the flow direction in the trap column is the same in the third switching position. This can be referred to as "forward flush" or "forward flushing". That is, that sample, or, at least the constituents of the sample that are not filtered by the trap column leave the trap column in the same direction that they were brought into it. This can be particularly advantageous, as the sample gets filtered while passing through the length of the trap column, leading to a purer sample. Furthermore, some undesirable constituents of the sample can get trapped at the entrance of the trap column. With forward flushing, these constituents will stay at the entrance of the trap column and not contaminate the analytical flow, and, consequently, the separation column. Therefore, the lifetime of the separation column can be extended. On the other hand, the sample can get further diluted during forward flushing. This can mean that more sample has to be used for testing. Depending on the application at hand, the third switching position allowing for sample forward flush can be particularly advantageous.

In some preferred embodiments, the system can further comprise a second switching valve. This second switching valve can be adapted to be fluidly connected with the first switching valve. Having a second switching valve can increase the maneuverability of the system, as more system elements can be interconnected in different ways. This can be advantageous, because, as described above, the liquid chromatography system can particularly benefit from the possibility to change system configuration without disassembling the system. In some embodiments, the second switching valve has the identical design as the first switching valve. This may simplify the production process.

In some embodiments, the second switching valve can comprise a plurality of ports and a plurality of connecting elements for changeably connecting the ports of the second switching valve. In preferred embodiments, the second switching valve can comprise at least four ports and at least two connecting elements. The second switching valve can preferably comprise at least five ports and at least three connecting elements. As discussed above, there are certain advantages associated with having a plurality of ports, but also with limiting their number. The second switching valve can be machined in the same way as the first switching valve, and therefore comprise preferably six ports. In some embodiments, only five ports of the second switching valve are used by the system. Therefore, one port can be blocked off. Additionally or alternatively, the second switching valve can also be machined differently from the first switching valve, and then comprise preferably five ports. The second switching valve can preferably comprise three connecting elements similarly to the first switching valve. This can be particularly advantageous for increased flexibility in connecting two different ports to each other, as also discussed above.

In embodiments with the second switching valve, the system can be adapted to assume a configuration wherein the second switching valve is connected with the first switching valve via two connecting lines, a first connecting line and a second connecting line. Connecting the two valves with two connecting lines can allow for a greater range of possible system configurations. That is, elements fixedly attached to the first switching valve (that is, preferably, to its ports) and elements fixedly attached to the second switching valve (that is, preferably, to its ports) can then be interconnected in different ways using the two connecting lines. Note, that connecting lines can also be separable. For example, one connecting line can comprise the sample pick up means (or the needle) and the corresponding seat (or the needle seat). In such embodiments, this connecting line may be disconnected as the sample pick up means leaves the seat and travels to the sample reservoir. This line can then be reconnected when the sample pick up means returns back to the seat. The connecting lines can comprise direct fluid connections, that is, a direct connecting between the two switching valves, preferably via two ports and tubing. The connecting lines can also comprise system elements and/or components. For example, one connecting line such as the first connecting line can comprise the metering device. This can be particularly advantageous, as the metering device can operate by generate pressure differences. This can be facilitated by "closing" or switching certain ports to dead ends, allowing the metering device to generate pressure differences by a piston mechanism or similar means. Placing the metering device on one of the connecting lines means that one valve can be used to facilitate its operation by, for example, switching the port to which the metering device is connected to a dead end.

In some embodiments, the system can further comprise at least one first solvent reservoir. The system can be adapted to assume a configuration wherein the solvent reservoir is fluidly connected with the metering device via the second switching valve and the first connecting line. That is, as described above, the metering device can be located on the first connecting line. Said first connecting line can be fixedly attached to the second switching valve on one of its sides (that is, to one port of the second switching valve). The solvent reservoir can be fixedly attached to the second switching valve, or preferably, to one port of the second switching valve. The second switching valve can then be switched in such a way, that a connecting element directly fluidly connects the ports comprising the first connecting line and the solvent reservoir. Then, the metering device can be fluidly connected with the solvent reservoir via tubing of the first connecting line and via the connecting element between the two ports. This can be useful when the metering device needs to draw in solvent that can be used to push the sample through the trap column for example.

In some embodiments, the system can further comprise a waste reservoir. The waste reservoir can be fixedly attached to one port of the second switching valve. The system can then be adapted to assume a configuration wherein the waste reservoir is fluidly connected with the trap column via the second switching valve and the second connecting line. That is, the trap column can be fixedly attached to two ports of the first switching valve (as it has two ends, two ports can be preferable). One of those two ports can be directly fluidly connected with the port comprising one end the second connecting line via a connecting element of the first switching valve. On the second switching valve, a connecting element can directly fluidly connect the port comprising the other end of the second connecting line with the port comprising the waste reservoir. In such a way, the waste reservoir can be connected with the trap column via two connecting elements of two switching valves and the tubing of the second connecting line. This can be advantageous, for example, when the trap column is purged. That is, the metering device can be connected with the other end of the trap column and use the solvent it can draw from one or more solvent reservoirs to purge or clean the trap column, with the unwanted constituents passing directly to waste without travelling through other elements of the system.

In some preferred embodiments wherein the system comprises a second switching valve and a waste reservoir, the first switching valve is adapted to assume a fourth switching position. In such embodiments, the fourth switching position of the first switching valve can be characterized by the following arrangement. The analytical pump can be fluidly connected with the waste reservoir via the second switching valve and the second connecting line. That is, the analytical pump can be fixedly attached to one port of the first switching valve. This port can then be directly fluidly connected with the port comprising one end of the second connecting line via a connecting element of the first switching valve. On the second switching valve, the port comprising the other end of the second connecting line can be directly fluidly connected with the port comprising the waste reservoir via a connecting element of the second switching valve. This can be particularly advantageous, as this position allows for pump purging and cleaning. The pump solvent can be replaced, and the tubing as well as the pump head can be thoroughly cleaned without contaminating the other elements of the system. The unwanted constituents can then be sent directly to waste without passing through any unnecessary tubing or components.

In embodiments wherein the system comprises a second switching valve, said second switching valve can be adapted to assume at least three distinct switching positions. The meaning of "switching positions" within this text has been specified above. In embodiments also comprising the metering device located on the first connecting line between the two switching valves and a waste reservoir, the first switching position of the second switching valve can be characterized by the following arrangement. The waste reservoir can be fluidly connected to the second connecting line. The first connecting line can comprise a dead end. That is, one of the ports to which the first connecting line is fixedly attached can be switched to a dead end or "closed off". This can, preferably, be a port on the second switching valve. As discussed above, such a configuration can allow the metering device to generate pressure by a piston mechanism or a similar means. This switching position can be used for purging or washing the system. The metering device can generate pressure to push a solvent or a cleaning agent through the elements, the connectors, and the tubing of the system in order to thoroughly wash them.

In embodiments comprising the second switching valve, two connecting lines and a solvent reservoir, the second switching valve can be adapted to assume a second switching position characterized by the following arrangement. The first solvent reservoir can be fluidly connected with the first connecting line. The second connecting line can comprise a dead end. As mentioned above, the metering device can be located on the first connecting line. In such embodiments, the metering device can then be fluidly connected with the solvent reservoir via tubing of the first connecting line. The metering device can then draw in solvent. However, in order to draw in solvent, the metering device needs to generate a pressure difference. This can be done by switching the second connecting line to a dead end on the second switching valve, while simultaneously directly fluidly connecting the ports comprising the first and second connecting lines on the first switching valve via a connecting element.

In embodiments comprising the second switching valve and the two connecting lines, the second switching valve can be adapted to assume a third switching position characterized by the following arrangement. The first connecting line can comprise a dead end. The second connecting line can comprise a dead end. Both of those dead end can be, preferably, achieved by switching port of the second switching line comprising the connecting lines to dead ends. In some preferred embodiments, the metering device can be located on the first connecting line. In such embodiments, the metering device can then be connected to a dead end via the first connecting line and the second switching valve. On the first switching valve, the second connecting line can be fluidly connected with one end of the trap column. The other end of the trap column can be fluidly connected with the first connecting line. In this way, the trap column, the corresponding tubing and the connectors can be located between two dead ends. The metering device can then pre-pressurize (equivalently, pressurize or precompress) the trap column to a pressure within the separation column. This can be particularly useful to avoid any pressure surges within the system which can damage the components. Furthermore, pressure surges can be difficult to reproduce, and therefore can lead to inconsistent results of the experiments. Pre-compressing the trap column therefore avoids reproducibility and reduced lifetime problems. Furthermore, the present configuration of the system allows the metering device to pre-compress the trap column by an interconnection of the two valves via the two connecting lines. In some embodiments, the metering device can be adopted to pressurize the trap column to a pressure of at least 100 bar, preferably at least 1000 bar, more preferably at least 1500 bar. This is also advantageous, as having the metering device do the pressurizing avoids the need for an additional pump. In the present system, the metering device is therefore adapted to generate high pressures, such as, for example, the ones required for high performance liquid chromatography.

In some preferred embodiments comprising the seat, the two connecting lines, and the analytical pump, the first switching valve can comprise the following configuration. One port of the first switching valve can be directly fluidly connected to the seat and to the first connecting line. Two ports of the first switching valve can be directly fluidly connected to the trap column. One port of the first switching valve can be directly fluidly connected to the separation column. One port of the first switching valve can be directly fluidly connected to the analytical pump. One port of the first switching valve is directly fluidly connected to the second connecting line. As discussed above, such a configuration can be particularly advantageous for allowing multiple interconnection possibilities between the ports. The specific advantages and possible switching positions are described above and below.

The term "direct fluid connection" or "directly fluidly connected" are used herein. When a port of a valve is said to be directly fluidly connected to another component, this should denote that fluid may flow from the port to the other component (and/or vice versa) without having to pass another port.

In some preferred embodiments comprising the second switching valve, the waste reservoir, the two connecting lines, and the solvent reservoir, the second switching valve can comprise the following configuration. One port of the second switching valve can be directly fluidly connected to the waste reservoir. One port of the second switching valve can be directly fluidly connected to the first solvent reservoir. One port of the second switching valve can be directly fluidly connected to the first connecting line. One port of the second switching valve can be directly fluidly connected to the second connecting line. As discussed above, such a configuration can be particularly advantageous for allowing multiple interconnection possibilities between the ports and/or the switching valves. The specific advantages and possible switching positions are described above and below.

In some embodiments, the system can further comprise a second solvent reservoir. In such embodiments, one port of the second switching valve can be directly fluidly connected to the second solvent reservoir. This can be particularly advantageous, as the metering device can then be fluidly connected to either the first or the second solvent reservoir via the first connecting line and the second switching valve. This allows for flexibility in choosing the solvent. For example, one solvent can be a cleaning agent. Alternatively, solvents with different chemical properties can be placed in the two solvent reservoirs, and the system can be adapted to quickly switch between the two depending on the needs of the particular experiment without having to exchange the solvent reservoir and therefore partially disassemble the system.

The system as described above and below can be adapted for high performance liquid chromatography. That is, the pressures and the corresponding forces within the system can be such as expected in H PLC. Therefore, all components, connectors and/or tubing within the system can be adapted to withstand such pressures and forces.

The switching valve (or valves) has been described as part of the liquid chromatography system, but can be viewed as a separate device for changeably connecting components. In such embodiments, the switching valve can be adapted to assume a fourth switching position wherein the first port is directly fluidly connected to a fifth port. In such embodiments, the switching valve can comprise one port that is adapted to be directly fluidly connected to a plurality of ports, such as five other ports. This yields increased flexibility of the valve. For example, a component connected to this one port can be directly fluidly connected to three, four or five other distinct components. This can, preferably, be done via connecting elements. In this way, dead volumes, contamination and leak or defect possibilities can be reduced, while the possible applications and configurations of the valve can be increased. In some embodiments, the switching valve can comprise a stator and a rotor. The stator can comprise the ports, and the rotor can comprise the connecting elements. That is, the valve can comprise a stationary part, and a rotational part (that is adapted to be moved with respect to the stationary part of the valve, preferably to be rotated). In this way, the features of the valve located on the stator, such as ports, can be connected by the features of the valve located on the rotor, such as connecting elements. In some embodiments, the connecting elements comprise grooves.

In some embodiments, the switching valve can be adapted for use in liquid chromatography. In some preferred embodiments, the switching valve can be adapted to be used for high precision liquid chromatography.

The method for sample loading as described above can be carried out by a liquid chromatography system.

In embodiments wherein the analytical pump adapted to provide a flow is provided, the method can further comprise providing a fluid connection between the trap column and the analytical pump. This fluid connection can be provided simultaneously with providing the fluid connection between the trap column and the separation column. This can be used to bring the sample into the analytical flow and subsequently into the separation column.

In some embodiments wherein the sample pick up means, a seat and the first switching valve, bringing the sample into the trap column comprises the following steps. The sample pick up means can be moved to a sample reservoir. The sample can then be sucked into the sample pick up means. Additionally, it may also be sucked into a tubing section adjacent to the sample pick up means (which tubing section may also be referred to as a sample loop). The sample pick up means can then be moved to the seat. The first switching valve can then be set to provide a fluid connection between the seat and the trap column. The sample can then be introduced into the trap column.

In some embodiments wherein the metering device is provided, the sample can be introduced into the trap column by means of the metering device. That is, as described above, the metering device can be adapted to generate a (negative) pressure difference that can draw the sample into the sample pick up means and also a (positive) pressure difference that can push the sample from the sample pick up means into the trap column.

In some embodiments wherein the analytical pump is provided, said analytical pump can be adapted for providing the flow in the first and/or in the second flow direction. That is, the analytical pump can be connected to other components in general and to the trap column in particular in such a way, that the flow it generates is in the first direction inside the trap column. Additionally, the analytical pump can be connected to the trap column in such a way that the flow it generates is in the second direction inside the trap column.

In some embodiments, the method comprises pressurizing the trap column after bringing the sample into it. In some preferred embodiments wherein the metering device is provided, said metering device pressurizes the trap column. This is particularly advantageous, as using the metering device for this eliminates the need for another pump. The pressurization is discussed in more detail above. In some embodiments, the method further comprises depressurizing the trap column after supplying the sample from the trap column to the separation column. Preferably, this can also be done by the metering device. The advantages are similar to the advantages of pressurizing or pre-pressurizing: the pressure surges that can potentially damage sensitive equipment are avoided.

In embodiments wherein the waste reservoir is provided, the method can further comprise fluidly connecting the trap column to the waste reservoir and supplying fluid from the trap column to the waste reservoir. The trap column and the waste reservoir can be fluidly connected after the sample is supplied from the trap column to the separation column. As also described above, this can allow for efficient purging and washing of the trap column without contaminating other elements of the system. Furthermore, it is particularly advantageous to perform washing of the trap column, the corresponding connectors and tubing while the sample is being analyzed in the separation column, as it allows for time-saving and improved efficiency of the system. In some preferred embodiments, the trap column and the waste reservoir can be fluidly connected after the trap column is depressurized. That is, the residual pressure can first be dissipated from the trap column by the metering device, and consequently the trap column can be purged and washed.

The invention is also defined by the following numbered embodiments. Below, system embodiments will be discussed. These embodiments are abbreviated by the letter "S" followed by a number. When reference is herein made to a system embodiment, those embodiments are meant.

S1. A liquid chromatography system (1000) comprising a separation column (4); a trap column (6); a first switching valve (200); wherein the first switching valve (200) is adapted to assume a first switching position for bringing a sample into the trap column (6) in a first flow direction; and wherein the switching valve (200) is adapted to assume a second switching position for fluidly connecting the trap column (6) with the separation column (4) and providing a flow from the trap column (6) to the separation column (4) in a second flow direction, which second flow direction is opposite to the first flow direction; and wherein the first switching valve (200) is adapted to assume a third switching position for fluidly connecting the trap column (6), with the separation column (4) and providing a flow from the trap column (6) to the separation column (4) in the first flow direction.

S2. A system according to embodiment 1 wherein the first switching valve (200) comprises a plurality of ports (212) and a plurality of connecting elements (222) for changeably connecting the ports (212) of the first switching valve (200).

S3. A system according to the preceding embodiment wherein the first switching valve (200) comprises at least four ports (212) and at least two connecting elements (222), preferably wherein the first switching valve (200) comprises at least six ports (212) and at least three connecting elements (222).

S4. A system according to the preceding embodiment wherein one port (2121) of the first switching valve (200) is adapted to be directly fluidly connected to at least three other ports (2122, 2123, 2124) of the first switching valve (200).

S5. A system according to any of the preceding embodiments further comprising an analytical pump (12) adapted to generate an analytical flow in the system.

S6. A system according to the preceding embodiment further comprising a pump solvent reservoir (13) adapted to supply the analytical pump (12) with solvent for the analytical flow.

S7. A system according to any of the preceding embodiments further comprising a metering device (100) adapted to bring the sample into the trap column (6) in a first switching position.

S8. A system according to any of the preceding embodiments further comprising a sample pick up means (8) adapted to retrieve the sample and a seat (10) adapted to receive the sample pick up means (8).

S9. A system according to the preceding embodiment and with the features of embodiments S2, S5 and S7 wherein the first switching position of the first switching valve (200) is characterized by the sample pick up means (8) located in the seat (10) fluidly connected with the trap column (6) via two ports (212) and one connecting element (222); and the metering device (100) connected with the sample pick up means (8) via tubing (510); and the analytical pump (12) fluidly connected with the separation column (4) via two ports (212) and one connecting element (222).

S10. A system according to any of the preceding embodiments and with the features of embodiments S2 and S5 wherein the second switching position of the first switching valve (200) is characterized by the analytical pump (12) being fluidly connected with the trap column (6) via two ports (212) and one connecting element (222); and the separation column (4) being fluidly connected with the trap column (6) via two ports (212) and one connecting element (222); and wherein the analytical pump (12) is generating flow from the trap column (6) to the separation column (4) in the first flow direction.

S11. A system according to any of the preceding embodiments and with the features of embodiments S2 and S5 wherein the third switching position of the first switching valve (200) is characterized by the analytical pump (12) being fluidly connected with the trap column (6) via two ports (212) and one connecting element (222); and the separation column (4) being fluidly connected with the trap column (6); and wherein the analytical pump (12) is generating flow from the trap column (6) to the separation column (4) in the second flow direction.

S12. A system according to any of the preceding embodiments further comprising a second switching valve (400) adapted to be fluidly connected with the first switching valve (200).

S13. A system according to the preceding embodiment wherein the system is adapted to assume a configuration wherein the second switching valve is connected with the first switching valve (200) via two connecting lines: a first connecting line (500) and a second connecting line (520).

S14. A system according to the preceding embodiment and with the features of embodiment S7 wherein the metering device (100) is connected on the first connecting line (500).

S15. A system according the preceding embodiment further comprising at least one first solvent reservoir (14), wherein the system is adapted assume a configuration wherein the solvent reservoir (14) is fluidly connected with the metering device (100) via the second switching valve (400) and the first connecting line (500).

S16. A system according to any of the preceding embodiments and with the features of embodiment S12 further comprising a waste reservoir (18), wherein the system is adapted to assume a configuration wherein the waste reservoir (18) is fluidly connected with the trap column (6) via the second switching valve (400) and the second connecting line (520).

S17. A system according to the preceding embodiment wherein the first switching valve (200) is further adapted to assume a fourth switching position, said fourth switching position characterized by the analytical pump (12) being fluidly connected with the waste reservoir (18) via the second switching valve (400) and the second connecting line (520).

S18. A system according to any of the preceding embodiments and with the features of embodiment S12 wherein the second switching valve (400) is adapted to assume at least three distinct switching positions.

S19. A system according to the preceding embodiment and with the features of embodiments S14 and S16 wherein the second switching valve (400) is adapted to assume a first switching position wherein the waste reservoir (18) is fluidly connected to the second connecting line (520); and the first connecting line (500) comprises a dead end.

S20. A system according to any of the preceding embodiments and with the features of embodiments S12, S13 and S15 wherein the second switching valve (400) is adapted to assume a second switching position wherein the first solvent reservoir (14) is fluidly connected with the first connecting line (500); and the second connecting line (520) comprises a dead end.

S21. A system according to any of the preceding embodiments and with the features of embodiments S12 and S13 wherein the second switching valve (400) is adapted to assume a third switching position wherein the first connecting line (500) comprises a dead end; and the second connecting line (520) comprises a dead end.

S22. A system according to any of the preceding embodiments and with the features of embodiment S12 wherein the second switching valve (400) comprises a plurality of ports (212) and a plurality of connecting elements (222) for changeably connecting the ports (212) of the second switching valve (400).

S23. A system according to the preceding embodiment wherein the second switching valve (400) comprises at least four ports (212) and at least two connecting elements (222), preferably wherein the second switching valve (400) comprises at least five ports (212) and at least three connecting elements (222).

S24. A system according to any of the preceding embodiments and with features of embodiments S2, S5, S8 and S13 wherein one port of the first switching valve (200) is directly fluidly connected to the seat (10) and to the first connecting line (510); and two ports of the first switching valve (200) are directly fluidly connected to the trap column (6); and one port of the first switching valve (200) is directly fluidly connected to the separation column (4); and one port of the first switching valve (200) is directly fluidly connected to the analytical pump (12); and one port of the first switching valve (200) is directly fluidly connected to the second connecting line (520).

The term "direct fluid connection" or "directly fluidly connected" us used herein. When a port of a valve is said to be directly fluidly connected to another component, this should denote that fluid may flow from the port to the other component (and/or vice versa) without having to pass another port.

S25. A system according to any of the preceding embodiments and with features of embodiments S12, S13, S15, S16 and S22 wherein one port of the second switching valve (400) is directly fluidly connected to the waste reservoir (18); and one port of the second switching valve (400) is directly fluidly connected to the first solvent reservoir (14); and one port of the second switching valve (400) is directly fluidly connected to the first connecting line (500); and one port of the second switching valve (400) is directly fluidly connected to the second connecting line (520).

S26. A system according to the preceding embodiments further comprising a second solvent reservoir (16) and wherein one port of the second switching valve (400) is directly fluidly connected to the second solvent reservoir (16).

S27. A system according to any of the preceding embodiments with the features of embodiment S7 wherein the metering device (100) is further adapted to pressurize the trap column (6).

S28. A system according to the preceding embodiment wherein the metering device (100) is adapted to pressurize the trap column (6) to a pressure of at least 100 bar, preferably at least 1000 bar, more preferably at least 1500 bar.

S29. A system according to any of the preceding claims, wherein the system is adapted for high performance liquid chromatography.

Below, valve embodiments will be discussed. These embodiments are abbreviated by the letter "V" followed by a number. When reference is herein made to a valve embodiment, those embodiments are meant.

V1. A switching valve (200) for changeably connecting components, wherein the switching valve (200) comprises a plurality of ports (212) adapted to be directly fluidly connected to a component, a plurality of connecting elements (222) adapted to changeably directly fluidly connect ports (212) to one another, wherein the switching valve (200) is adapted to assume a first switching position, wherein a first port (2121) is directly fluidly connected to a second port (2123), a second switching position, wherein the first port (2121) is directly fluidly connected to a third port (2124) a third switching position, wherein the first port (2121) is directly fluidly connected to a fourth port (2125).

V2. A switching valve (200) in accordance with the preceding embodiment, wherein the switching valve (200) is further adapted to assume a fourth switching position, wherein the first port (2121) is directly fluidly connected to a fifth port (2126).

V3. A switching valve (200) in accordance with any of the preceding valve embodiments, wherein the switching valve (200) comprises a stator which comprises the ports (212) and a rotor which comprises the connecting elements (222).

V4. A switching valve (200) in accordance with any of the preceding valve embodiments, wherein the connecting elements (222) are grooves.

V5. A switching valve (200) in accordance with any of the preceding valve embodiments, wherein the switching valve (200) is adapted to be used for liquid chromatography.

V6. A switching valve (200) in accordance with the preceding embodiment, wherein the switching valve (200) is adapted to be used for high precision liquid chromatography.

W1. Use of the switching valve (200) in accordance with any of the preceding valve embodiments in liquid chromatography.

W2. Use of the switching valve (200) in accordance with any of the preceding valve embodiments in high pressure liquid chromatography.

Below, method embodiments will be discussed. These embodiments are abbreviated by the letter "M" followed by a number. When reference is herein made to a method embodiment, those embodiments are meant.

M1. A method for sample loading comprising the steps of providing a first switching valve (200) comprising at least three distinct switching positions, a trap column (6) and a separation column (4); and bringing a sample into the trap column (6) in a first flow direction using a first switching position; and connecting the trap column (6) with the separation column (4) and providing a flow from the trap column (6) to the separation column (4) in a second flow direction, which second flow direction is opposite to the first flow direction, using a second switching position; and connecting the trap column (6) with the separation column (4) and providing a flow from the trap column (6) to the separation column (4) in the first flow direction using a third switching position.

M2. A method according to the preceding embodiment, wherein the method is carried out by a liquid chromatography system (1000).

M3. A method according to the preceding embodiment, wherein the liquid chromatography system comprises an analytical pump (12) adapted to provide an analytical flow.

M4. A method according to the preceding embodiment, wherein the method also comprises providing a fluid connection between the trap column (6) and the analytical pump (12), wherein the fluid connection between the trap column (6) and the analytical pump (12) is provided simultaneously with providing the fluid connection between the trap column (6) and the separation column (4).

M5. A method according to any of the preceding method embodiments with the features of embodiment M2, wherein the liquid chromatography system (1000) comprises a metering device (100).

M6. A method according to any of the preceding method embodiments with the features of embodiment M2, wherein the liquid chromatography system (1000) comprises a sample pick up means (8), a seat (10) to receive the sample pick up means (8) and the first switching valve (200).

M7. A method according to the preceding embodiment, wherein bringing the sample into the trap column (6) comprises the sample pick up means (8) being moved to a sample reservoir (2), the sample being sucked into the sample pick up means (8) and into a tubing section (512) adjacent to the sample pick up means (8), the sample pick up means (8) being moved to the seat (10), the first switching valve (200) being set to provide a fluid connection between the seat (10) and the trap column (6), the sample being introduced into the trap column (6).

M8. A method according to the preceding embodiment and with the features of embodiment M5, wherein the sample being introduced into the trap column (6) is done by means of the metering device (100).

M9. A method according to any of the preceding method embodiments with the features of embodiment M3 wherein providing the flow in the first and/or in the second flow direction is done by means of the analytical pump (12).

M10. A method according to any of the preceding method embodiments, wherein the method comprises pressurizing the trap column (6) after bringing the sample into it.

M11. A method according to the preceding embodiment and with the features of embodiment M5 wherein the metering device (100) pressurizes the trap column (6).

M12. A method according to any of the preceding method embodiments, wherein the method comprises depressurizing the trap column (6) after supplying the sample from the trap column (6) to the separation column (4).

M13. A method according to the preceding embodiment and with the features of embodiment M5, wherein the metering device (100) depressurizes the trap column (6).

M14. A method according to any of the preceding method embodiments and with the features of embodiment M10 wherein the trap column (6) is pressurized to a pressure of at least 100 bar, preferably at least 1000 bar, more preferably at least 1500 bar.

M15. A method in accordance with any of the preceding method embodiments with the features of embodiment M2, wherein the liquid chromatography system (1000) comprises a waste reservoir (18).

M16. A method in accordance with the preceding embodiment, wherein the method comprises fluidly connecting the trap column (6) to the waste reservoir (18) and supplying fluid from the trap column (6) to the waste reservoir (18), wherein the trap column (6) and the waste reservoir (18) are fluidly connected after the sample is supplied from the trap column (6) to the separation column (4).

M17. A method in accordance with any of the preceding method embodiments with the features of embodiments M12 and M16, wherein the trap column (6) and the waste reservoir (18) are fluidly connected after the trap column (6) is depressurized.

Below, use embodiments will be discussed. These embodiments are abbreviated by the letter "U" followed by a number. When reference is herein made to a use embodiment, those embodiments are meant.

U1. Use of the liquid chromatography system (1000) according to any of the preceding system embodiments S1 to S29.

U2. Use according to U1, wherein the first switching valve (200) assumes a first switching position in which the sample is brought into the trap column (6) in the first flow direction; and the first switching valve (200) assumes a second switching position in which the trap column (6) is fluidly connected with the separation column (4) and a flow is provided in a second flow direction, which second flow direction is opposite to the first flow direction; and the first switching valve (200) assumes a third switching position in which the trap column (6) is fluidly connected with the separation column (4) and a flow is provided in the first flow direction.

U3. Use according to any of the preceding use embodiments and with the features of embodiment S5, wherein the use also comprises providing a fluid connection between the trap column (6) and the analytical pump (12), wherein the fluid connection between the trap column (6) and the analytical pump (12) is provided simultaneously with providing the fluid connection between the trap column (6) and the separation column (4).

U4. Use according to any of the preceding use embodiments and with the features of embodiment S8, wherein bringing the sample into the trap column (6) comprises the sample pick up means (8) being moved to a sample reservoir (2), the sample being sucked into the sample pick up means (8) and into a tubing section (512) adjacent to the sample pick up means (8), the sample pick up means (8) being moved to the seat (10), the first switching valve (200) being set to provide a fluid connection between the seat (10) and the trap column (6), the sample being introduced into the trap column (6).

U5. Use according to the preceding embodiment and with the features of embodiment S7, wherein the sample being introduced into the trap column (6) is done by means of the metering device (100).

U6. Use according to any of the preceding use embodiments with the features of embodiment S5 wherein providing the flow in the first and/or in the second flow direction is done by means of the analytical pump (12).

U7. Use according to any of the preceding use embodiments, wherein use comprises pressurizing the trap column (6) after bringing the sample into it.

U8. Use according to the preceding embodiment and with the features of embodiment S7 wherein the metering device (100) pressurizes the trap column (6).

U9. Use according to any of the preceding use embodiments, wherein use comprises depressurizing the trap column (6) after supplying the sample from the trap column (6) to the separation column (4).

U10. Use according to the preceding embodiment and with the features of embodiment S7, wherein the metering device (100) depressurizes the trap column (6).

U11. Use according to any of the preceding use embodiments and with the features of embodiment U7 wherein the trap column (6) is pressurized to a pressure of at least 100 bar, preferably 1000 bar, more preferably at least 1500 bar.

U12. Use according to any of the preceding use embodiments and with the features of embodiment S16, wherein the use comprises fluidly connecting the trap column (6) to the waste reservoir (18) and supplying fluid from the trap column (6) to the waste reservoir (18), wherein the trap column (6) and the waste reservoir (18) are fluidly connected after the sample is supplied from the trap column (6) to the separation column (4).

U13. Use according to the preceding embodiment and with the features of embodiment U9, wherein the trap column (6) and the waste reservoir (18) are fluidly connected after the trap column (6) is depressurized.

BRIEF DESCRIPTION OF THE DRAWINGS

The above features along with additional details of the invention, are described further in the examples below, which are intended to further illustrate the invention but are not intended to limit its scope in any way.

DETAILED DESCRIPTION OF EMBODIMENTS

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

It is noted that not all of the drawings carry all the reference signs. Instead, in some of the drawings, some of the reference signs have been omitted for sake of brevity and simplicity of illustration.

Figure 1:
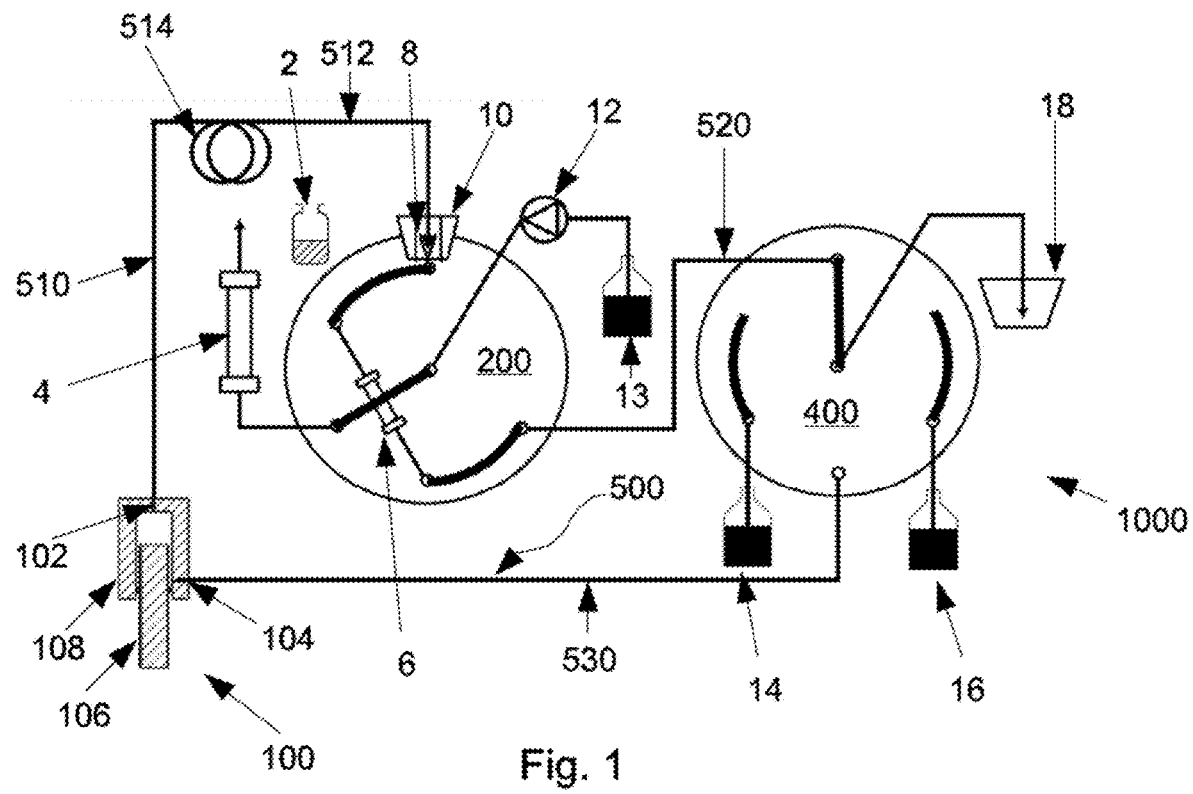
FIG. 1 schematically depicts a liquid chromatography system according to one embodiment of the invention.

FIG. 1 depicts a liquid chromatography system 1000 according to one aspect of the invention. The system 1000 comprises a sample reservoir 2 comprising a sample to be analyzed. The system 1000 further comprises a separation column 4 and a trap column 6. The system comprises a sample pick up means 8, shown here as a needle 8 and a seat 10, shown here as needle seat 10. The liquid chromatography system comprises an analytical pump 12 and a pump solvent reservoir 13. FIG. 1 further shows two solvent reservoirs 14 and 16, but in other embodiments of the system 1000 one solvent reservoir 14 or 16 can be used. The system 1000 further comprises a waste reservoir 18. The liquid chromatography system also comprises a metering device 100. The metering device 100 comprises a port 102, a port 104, a piston 106 and a housing 108. The liquid chromatography system 1000 further comprises two switching valves, a first or left switching valve 200 and a second or right switching valve 400. The system 1000 also comprises tubing or capillaries connecting various components. Tubing 510 connects port 102 of the metering device 100 with the needle 8. Tubing 512 can be directly adjacent to the needle 8. Between the metering device 100 and the needle 8, past tubing 512, system 1000 can further comprise a sample loop 514. Tubing 520 connects the first switching valve 200 directly to the second switching valve 400, and may also be referred to as a second connecting line. Tubing 530 connects port 104 of the metering device 100 with the second switching valve 400. Tubing 510, 514, 512 and 530 may collectively be referred to as a first connecting line 500. That is, the first connecting line 500 connects the first switching valve 200 with the second switching valve 400 via the needle 8 and needle seat 10 one the one hand, and via the metering device 100 on the other hand.

The liquid chromatography system 1000 is adapted to retrieve a sample from the sample reservoir 2. This can be achieved via the sample pick up means 8. The sample pick up means 8 can travel to the sample reservoir 2, retrieve the sample, and travel back to the seat 10. Retrieval of the sample can be done via a pressure difference generated by the metering device 100. The metering device 100 can move its piston 106 outward of the metering device housing 108 to draw in solvent 14 or solvent 16, and then move further outward to generate the pressure difference for sucking in the sample from the sample reservoir 2. The sample can then be introduced into the system via tubing 512, which tubing 512 may also be referred to as a sample loop. The sample can be first stored in the needle 8 and optionally also in the tubing 512. FIG. 1 further depicts a buffer loop 514. The buffer loop 514 provides a tubing reserve, i.e., it enables the pick up means 8 (e.g., needle) to change its position, while remaining connected to the tubing. Picking up the sample is further discussed in relation to FIGS. 3 and 4.

The liquid chromatography system 1000 is further adapted to introduce the sample into the trap column 6. This can be done via the metering device as well, by moving its piston 106 and generating a pressure difference. This is further discussed in relation to FIG. 5.

The liquid chromatography system 1000 is further adapted to pre-compress the trap column 6 to the pressure of the separation column 4. In High Performance Liquid Chromatography (HPLC), the pressures at which the sample is separated into its constituents in the separation column 4 can exceed 400 bar. It can be on the order of a few hundred bar or exceed 1.000 bar, such as 1.500 bar. Therefore, the pressure within the separation column can significantly differ from the pressure within the parts of the system in contact with the atmosphere, such as the needle 8. The pre-compressing then allows to equilibrate the pressure within the system. Pre-compressing can be done via the metering device 100 by generating a positive pressure via the piston 106. This is further discussed in relation to FIG. 6.

The system 1000 is also adapted to inject the sample from the trap column 6 to the separation column 4 by means of the analytical flow. This can be done by guiding the sample by means of the analytical pump 12. The injection of the sample into the into the separation column 4 can be done in a back flush and in a forward flush manner via different positions of the switching valve 200. That is, the flow from the trap column 6 to the separation column 4 can ensue in the same direction as the flow from the needle 8 to the trap column 6 above (forward flush). The flow from the trap column 6 to the separation column 4 can also ensue in the opposite direction to the flow from the needle 8 to the trap column 6 above (backward flush). Switching between the two options can be done via different switching positions of the valve 200 without dismantling the system 1000. This is further explained in relation to FIGS. 7a and 7b.

The liquid chromatography system 1000 is also adapted to decompress the trap column 6. After sample injection into the separation column 4, the system 1000 is at analytical pressure, which, as discussed above, can be on the order of several hundred bar or even above 1.500 bar. Before reconnecting the trap column 6 with the outside, which is at atmospheric pressure, it can be advantageous to decompress it in a controlled manner. This can be done via the metering device 100 by displacing the piston 106 in order to reduce the pressure within the trap column 6. This is further discussed in relation to FIG. 8.

The system 1000 is also adapted to clean or wash itself. Particularly, the metering device 100 can draw in solvent from solvent reservoirs 14 or 16 by displacing the piston 106 and generating a pressure difference. The solvent can then be passed through the buffer loop 514, tubing 512, the needle 8, the needle seat 10 and the trap column 6 and the respective connecting elements of the valve in order to remove any residual components of the sample or of the flow. These can then be washed by the solvent and delivered into the waste reservoir 18. This is further discussed in relation to FIG. 9.

The liquid chromatography system 1000 can also be adapted to clean or purge the analytical pump 12. The pump solvent reservoir 13 may be replaced (e.g., the solvent may be selected by a solvent selector valve) and the pump 12 washed with the residual fluid delivered into the waste reservoir 18. This is further discussed in relation to FIG. 10.

Note, that the present depiction uses two similar switching valves, but this is not necessary. The switching valves can be identical—that is have the same configuration of ports and connecting elements. For the case of the present invention, one of the ports of the right switching valve 400 could be closed off or plugged by means of a blind plug (not depicted), as it is not in use. The switching valves can also be manufactured differently. For example, in the present case, the right switching valve 400 can have one less port than the left switching valve 200. The solvent or analytical pump 12 here is connected to the middle port of the left switching valve 200. The other ports are occupied clockwise as follows: needle seat 10 and metering device 100 (the connection to the metering device being in place only in the configuration when the needle 8 is in the needle seat 10 and said connection going through tubing 512, buffer loop 514 and tubing 510, as, e.g., depicted in FIG. 1), second connecting line 520 to the right (second) valve 400, trap column connection 1, separation column 4, trap column connection 2. On the right valve 400, the middle port is connected to the waste reservoir 18 and further ports are occupied clockwise as follows: second connecting line 520 to the left (first) valve 200, second solvent reservoir 16, metering device 100 (or first connecting line 510) and first solvent reservoir 14. In the presently depicted position, the solvent pump 12 can be continuously pumping solvent directly to the separation column 4 to equilibrate the system.

Figure 2:
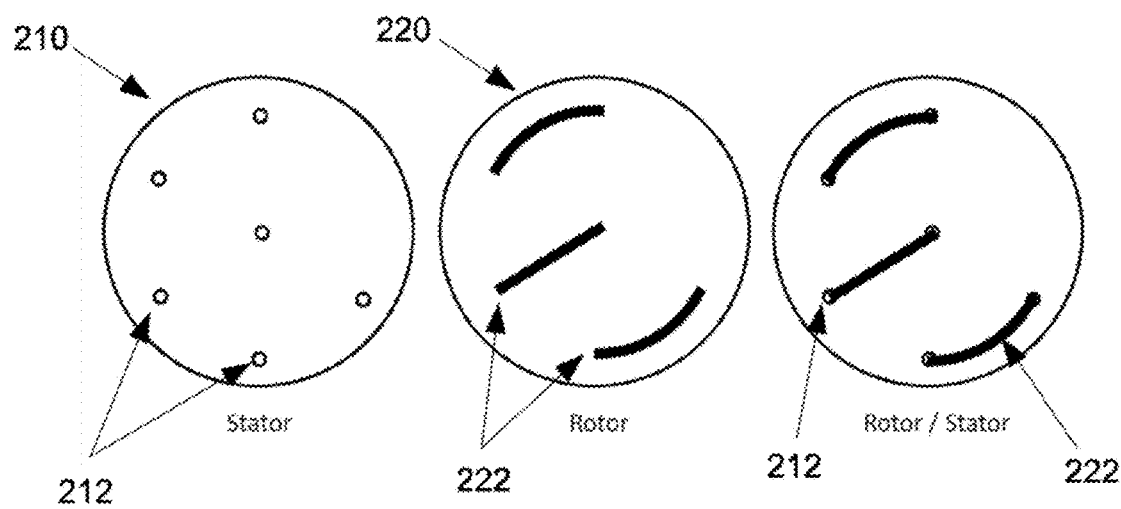
FIG. 2 schematically depicts features of a switching valve according to one embodiment of the invention.

FIG. 2 schematically illustrates a switching valve such as the first (or left) switching valve 200 and/or the second (or right) switching valve 400. As discussed above, the valves can be manufactured identically with one port 212 of the right switching valve 400 plugged, or they can be manufactured differently, with the right switching valve 400 comprising one less port 212 than the left switching valve 200. Each switching valve 200 may comprise a stator 210 and a rotor 220. The stator 210 may comprise ports 212 to which different elements may be connected (e.g., in the embodiment depicted in FIG. 1, each of the needle 8, the analytical pump 12, the separation column 4 and the tubing 520 to the other switching valve 400 is fluidly connected to one port of the switching valve 200, respectively, and the trap column 6 is fluidly connected to two ports of this switching valve 200). The rotor 220 may comprise connecting elements 222, such as grooves 222, that may interconnect different ports 212 of the stator element 210. For example, FIG. 1 depicts a configuration where each connecting element 222 of the rotor of the left distribution valve 200 interconnects two ports of said switching valve, respectively, while the stator and the rotor of the second switching valve 400 are in such a configuration that only two of the ports in the second switching valve are interconnected to one another (that is, the ports connecting tubing 520 and waste reservoir 18 are connected by a connecting element of the second switching valve 400). It will be understood that whenever two elements are described to be connected to one another, this denotes a fluid connection, i.e., a connection where a fluid may flow from one element to the other, unless otherwise specified or unless clear to the skilled person that something different is meant. Furthermore, also the term "direct fluid connection" or directly fluidly connected will be used. When a port of a valve is said to be directly fluidly connected to another component, this should denote that fluid may flow from the port to the other component (and/or vice versa) without having to pass another port. For example, the port in the center of switching valve 200 in FIG. 1 is directly fluidly connected to analytical pump 12. However, this central port is not directly fluidly connected to the separation column 4 in FIG. 1 (as the fluid connection between the central port and separation column 4 in FIG. 1 also includes another port).

Note, that in the present depiction, a stator with six ports 212 and a rotor with three connecting elements or grooves 222 are shown. However, it is also possible to have a different number of ports 212 or grooves 222, a different arrangement of ports 212, a different groove 222 design, or also to have grooves 222 in the stator.

Figure 3:
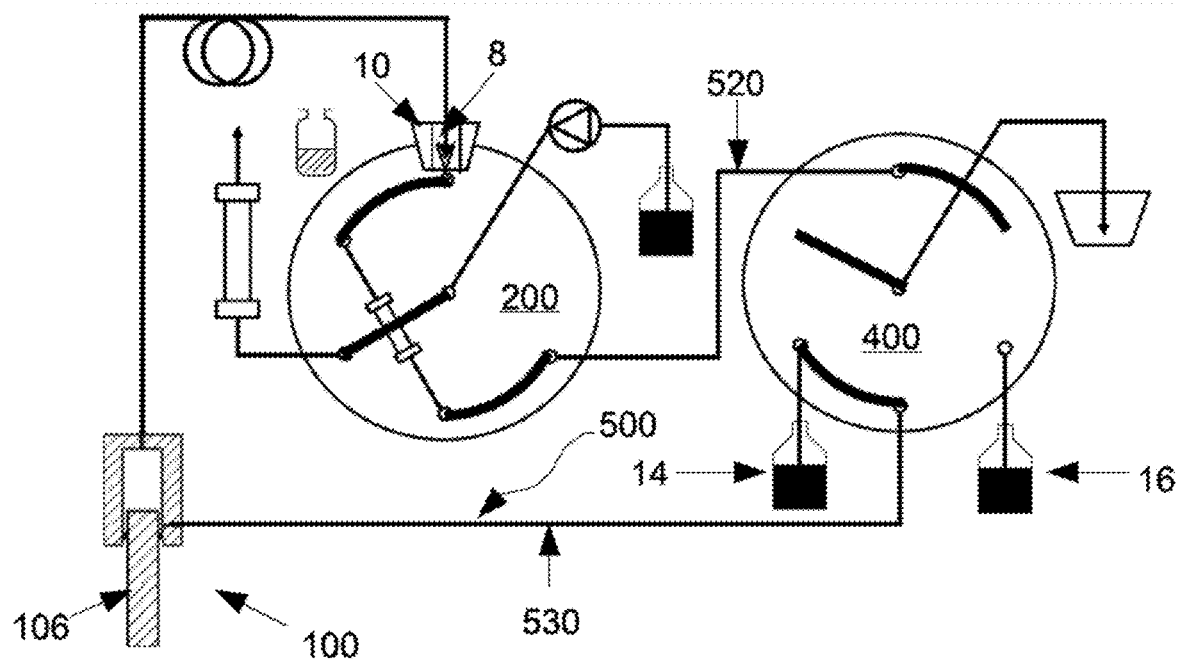
FIG. 3 schematically depicts filling of the metering device with solvent according to one embodiment of the invention.

FIG. 3 schematically depicts filling of the metering device 100 with solvent according to one embodiment of the invention. The needle 8 remains in the needle seat 10 and the second switching valve 400 closes one end of the second valve connecting line 520. The right switching valve 400 is fluidly connecting the metering device 100 to the solvent reservoir 14. Note, that connection to solvent reservoir 16 would also be possible by a different switching state of switching valve 400, as both switching positions close one end of the second valve connecting line 520. The piston 106 of the metering device 100 can now move back in order to create negative pressure and draw up solvent from the solvent reservoir 14 and partially fill the metering device 100 with it (the metering device 100 needs to have enough residual space to also draw in the sample). The metering device 100 can then have enough solvent in order to guide the sample into the trap column for the trapping.

Figure 4:
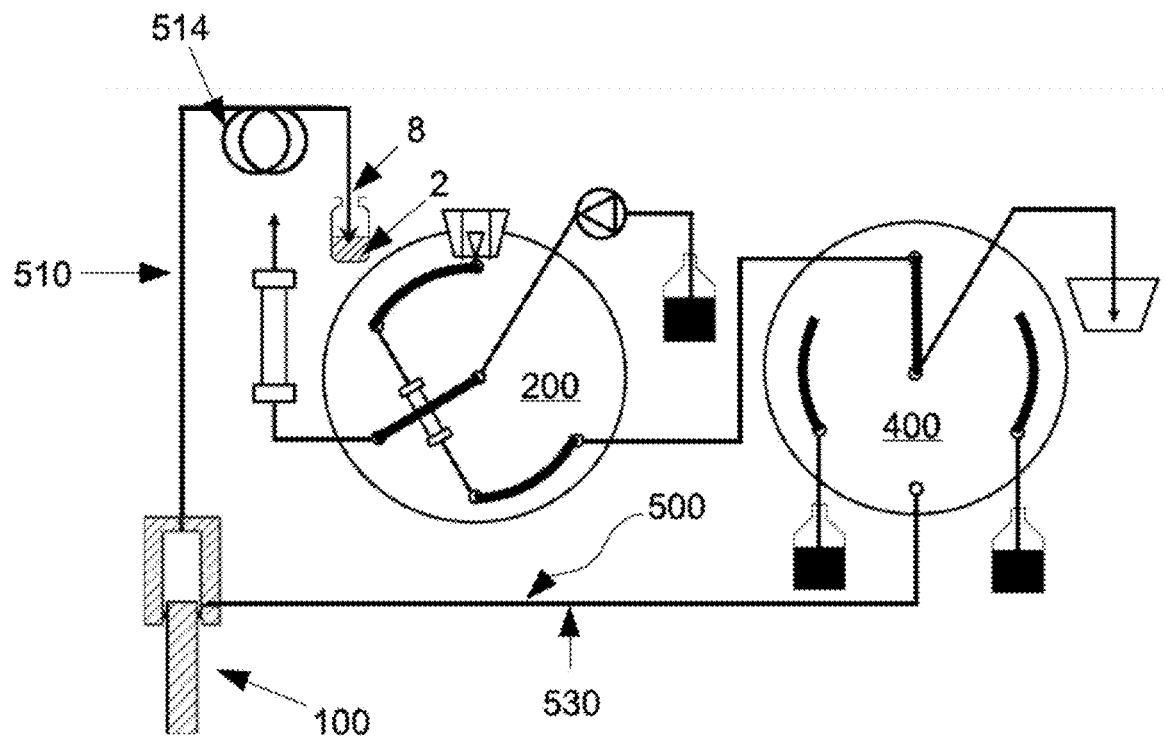
FIG. 4 schematically depicts drawing in of the sample according to one embodiment of the invention.

FIG. 4 schematically depicts drawing in of the sample according to one embodiment of the invention. The needle 8 moves to the sample reservoir 2. The second switching valve 400 closes the supply line to the metering device 100 by switching from the solvent reservoir 14 to a dead end. In this way, the metering device 100 can generate negative pressure by retreating its piston 106 further to draw in the sample through the needle 8.

Figure 5:
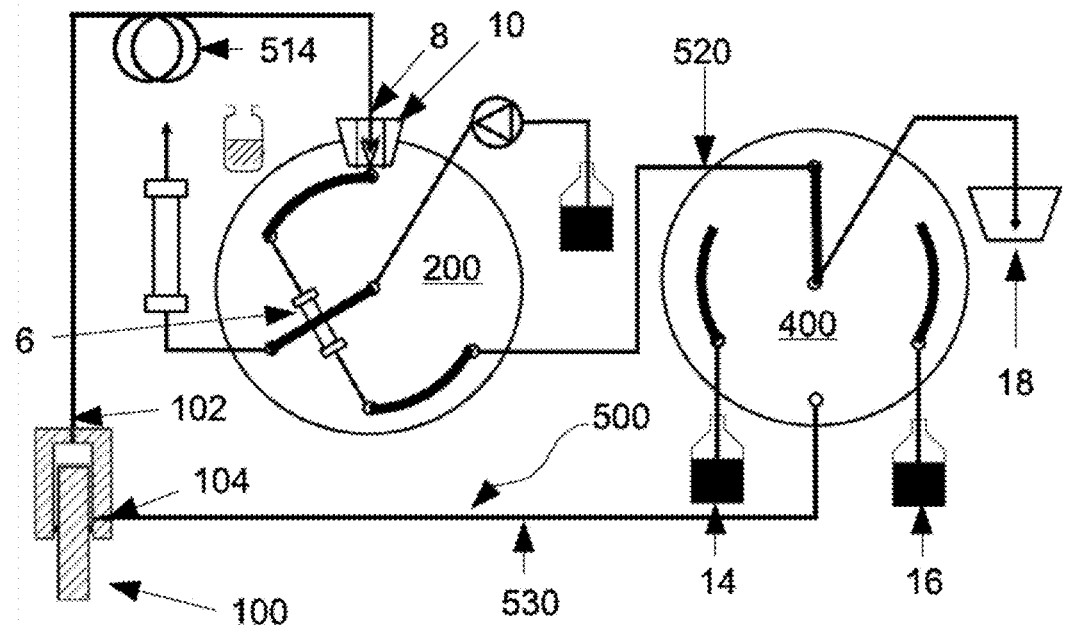
FIG. 5 schematically depicts sample injection into the trap column according to one embodiment of the invention.

FIG. 5 schematically depicts sample injection into the trap column 6 according to one embodiment of the invention. The needle 8 now returns to the needle seat 10. The sample can be meanwhile stored in the needle 8 and/or the tubing 512. The metering device 100 can now generate a positive pressure by moving its piston 106 back into the housing 108. In this way, the sample can be pushed in the other direction through the needle 8 into the trap column 6. The right valve 400 connects the side of the trap column 6 opposite to the one the sample arrived through with the waste reservoir 18. In this position, the piston 106 of the metering device 100 can move forward and therefore push the sample with the previously raised trap solvent to the trap column 6. Components which do not adhere (e.g., undesirable components) to the trap column 6 get pushed out to waste reservoir 18. This process may be repeated if the right valve 400 again connects the port 104 (which may also be referred to as the rear output) of the metering device 100 with the solvent reservoirs 14 or 16 and therefore allows the metering device 100 to raise fresh trap solvent. That is, more trap solvent may be introduced into the section of the system fluidly connected to the trap column 6 in FIG. 5. To do so, valve 400 is moved to connect tubing 530 to solvent reservoir 14 or 16 (that is the configuration of valve 400 in FIG. 3), port 102 of metering device 100 is closed (i.e., connected to a dead end as in FIG. 3) and port 104 of the metering device 100 is opened (i.e. connected to the solvent reservoir 14 or 16 as in FIG. 3). When the piston 106 is moved back in such a configuration, solvent is drawn from the solvent reservoir 14 (or 16) into the metering device 100. Subsequently, port 104 can be closed (i.e. connected to a dead end) and port 102 be opened (i.e. not connected to a dead end). Then, piston 106 may be moved forward to supply the solvent into tubing section 510 to thereby supply more solvent towards the trap column 6. This process may also be referred to as trapping (and retrapping) the sample.

Figure 6:
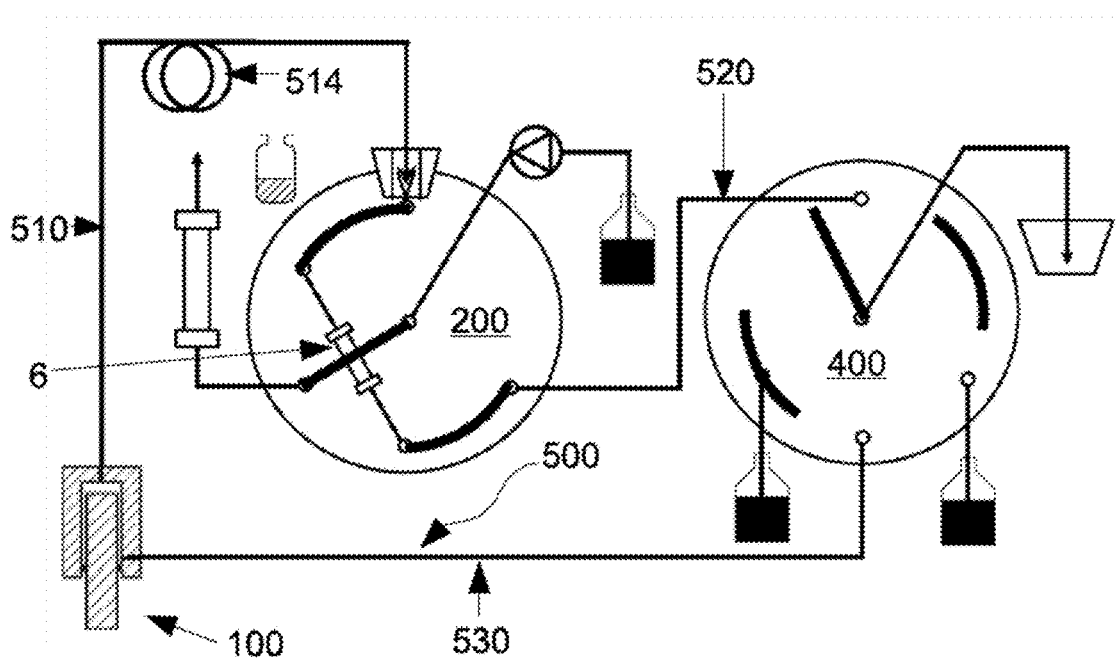
FIG. 6 schematically depicts pre-compression of the trap column according to one embodiment of the invention.

FIG. 6 schematically depicts pre-compression of the trap column 6 according to one embodiment of the invention. The right valve 400 switches to an intermediate position, i.e., to the position where tubing 520 and tubing 530 are switched to dead ends and are not connected to any other ports. The piston 106 in the metering device 100 moves forward, such that volume in the tubing 510, the buffer loop 514, the tubing 512, the needle 8, the trap column 6, the metering device 106 and the connections is compressed. It can be compressed until analytical pressure is reached. There may also be provided a pressure sensor (not depicted) in the system. The pressure sensor may be fluidly connected to the metering device 100 (e.g., it may be disposed between metering device 100 and the second switching valve 400). Thus, when precompressing a section of the system 1000 (as discussed), one may monitor the pressure in this section— e.g., to bring this pressure to the analytical pressure. The sensor may also be used for monitoring the decompression of a section of the system (see below). By the pre-compression step, the sample in the trap column 6 may be brought to an elevated pressure, such as to the analytical pressure. This helps avoid pressure spikes in the separation column 4 during sample injection. Not having pressure spikes may reduce the likelihood of the sample being mixed with solvent, i.e., dispersion. Having a less dispersed sample leads to a more defined peak in subsequent analysis, thereby resulting in an improved analysis.

Figure 7A:
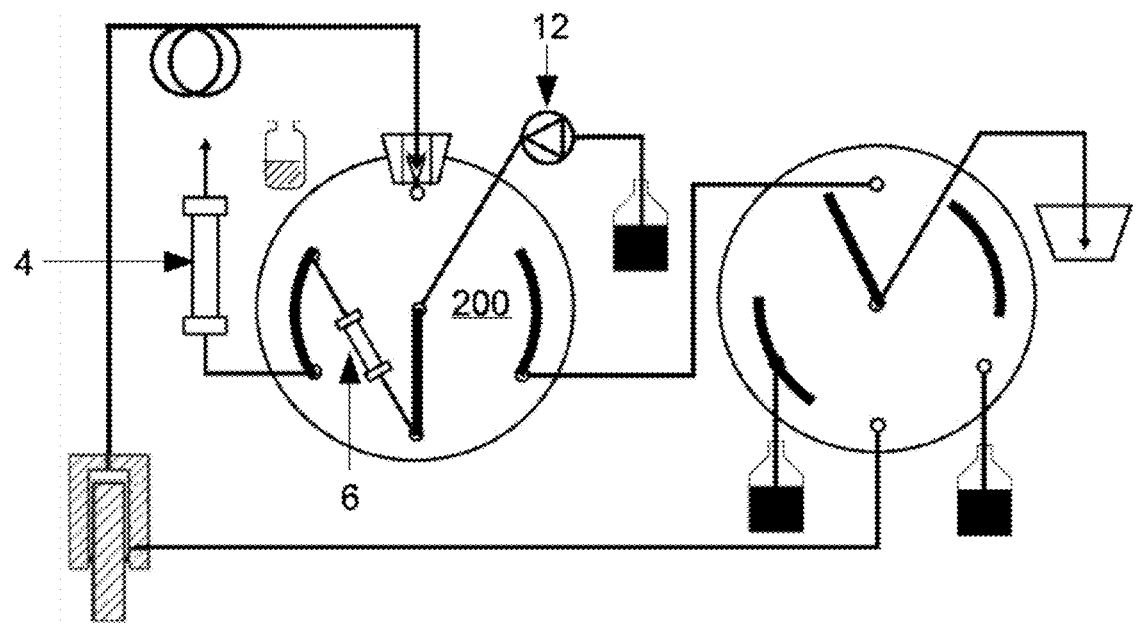
FIG. 7a schematically depicts back flush injection of the sample into the separation column according to one embodiment of the invention.
Figure 7B:
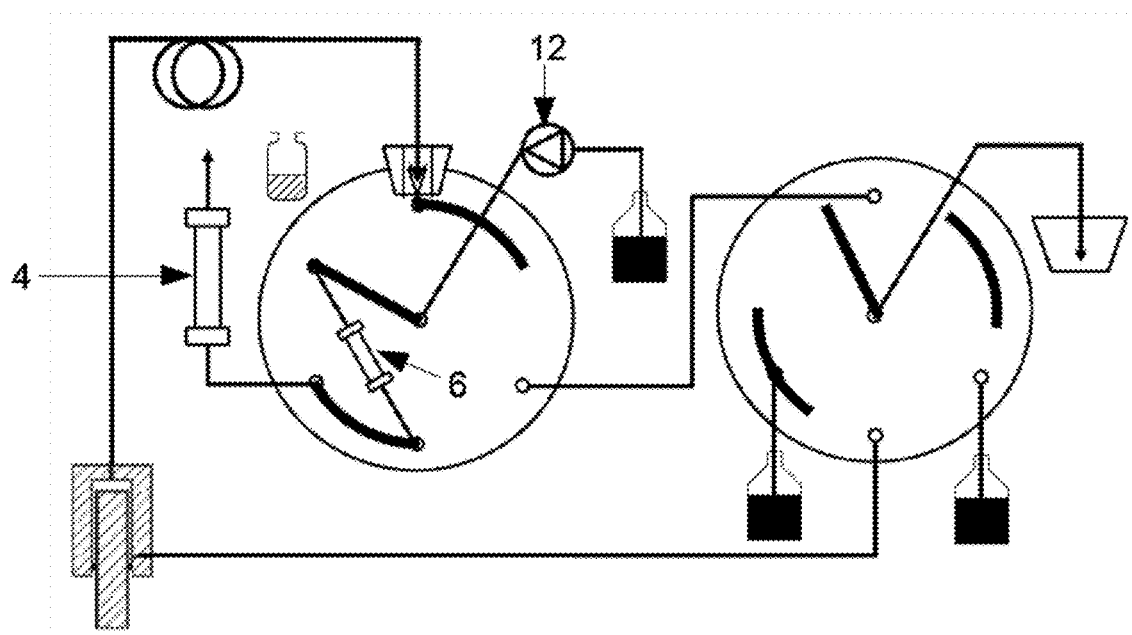
FIG. 7b schematically depicts forward flush injection of the sample into the separation column according to one embodiment of the invention.

FIG. 7a and FIG. 7b schematically depict injection of the sample into the separation column 4 according to one embodiment of the invention. Note, that in both configurations, there is a direct fluid connection from the solvent pump 12 to the trap column 6, and from the trap column 6 to the separation column 4 allowing for small dead volumes and little dispersion.

FIG. 7a demonstrates injection of the sample via back flushing. The left valve 200 is switched such that the trap column 6 is introduced into the analytical flow in such a way that the analytical flow pushes the sample back out the side it came from (backward flush). That is, the flow direction through the trap column 6 is opposite to the flow direction in which the trap column 6 was supplied with the sample. Put differently, a first end of the trap column 6 that has been upstream from a second end of the trap column 6 when being provided with the sample is now downstream from this second end when the analytical flow is provided through the trap column 6. In other words, the sample is flushed from the trap column entrance to the separation column 4.

FIG. 7b demonstrates injection of the sample via forward flushing. That is, the flow direction through the trap column 6 is parallel to the flow direction with which the trap column 6 was supplied with the sample. Put differently, a first end of the trap column 6 that has been upstream to a second end of the trap column 6 when being provided with the sample is now also upstream to this second end when the analytical flow is provided through the trap column 6. In other words, the solvent pump maintains the direction of the previous charging flow, and the sample is guided through the length of the trap column 6 into the separation column 4.

Note, that switching between configurations shown in FIGS. 7a and 7b is done by moving the connecting elements 222 (not shown) of the first switching valve 200. That is, the process of switching between the back flush and forward flush configurations can be done without dismounting the apparatus and without hardware changes. It is not necessary to manually or automatically switch the ports 212 (not shown) of the switching valve 200 to which the analytical pump 12, the trap column 6 and the separation column 4 are connected. These components remain connected to the same ports 212 in the backward and forward flush configurations. This is achievable due to the topology of the switching valve 200 and the flexibility in the connection of various pairs of ports 212 with the connecting elements or grooves 222. Therefore, in the present configuration, switching between the backward flush as in FIG. 7a and the forward flush as in FIG. 7b is simple and fast, and can be done between experiments without reconfiguring the liquid chromatography system 1000.

As will be appreciated when considering FIGS. 3, 7a and 7b, there may be provided fluid connections from the solvent reservoir 14 to the trap column 6 and from the trap column 6 to the separation column 4 (in both configurations—forward flush and backward flush) that are relatively correct, i.e., without there being disposed many components in the fluid paths. This may lead to small dead volumes and little dispersion, which may be advantageous.

Figures 8, 9:
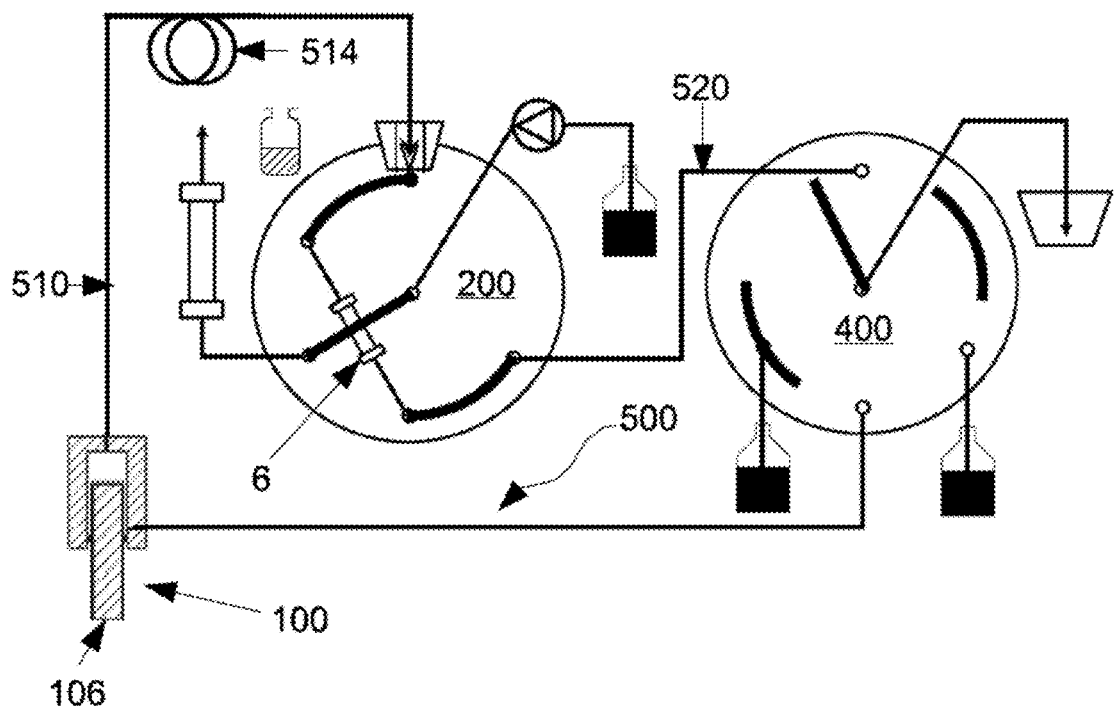
FIG. 8 schematically depicts decompression of the trap column according to one aspect of the invention.
FIG. 9 schematically depicts washing of the system according to one aspect of the invention.

FIG. 8 schematically depicts decompression of the trap column 6 according to one aspect of the invention. This configuration is similar to the one depicted in FIG. 6. Again, the trap column 6 is fluidly connected to the tubing 520 connecting valves 200 and 400 and to the tubing 510 (followed by the buffer loop 514, the tubing 512, the needle 8), providing a connection to the metering device 100. By moving the piston 106 back, the pressure still present in the portion of the system 1000 fluidly connected to the trap column 6 (including the buffer loop 514, the tubing 512, the needle 8, the metering device 100 and the connections) can be reduced. In other words, the metering device 100 can now decompress the buffer loop 514, the tubing 512, the needle 8, the trap column 6 and the corresponding tubing to ambient pressure or approximately atmospheric pressure. That is, this configuration may also be referred to as the decompress state. The controlled decompression may be advantageous for different reasons. By means of the controlled decompression, no uncontrolled and more rapid decompression occurs. Thus, the controlled decompression leads to less abrasion on the valve 200 and other components and also prevents fluid from rapidly exiting the system (which could be a risk for a user). Furthermore, the controlled decompression also lowers the risk of components outgassing in the fluid in the system.

FIG. 9 schematically depicts washing of the system according to one aspect of the invention. The trap column 6 is here fluidly connected to the waste reservoir 18. The metering device 100 can then wash itself, the tubing 510, buffer loop 514, the tubing 512, the grooves, the needle 8 and the needle seat 10, as well as the trap column 6 and the tubing 520. To do this, the right switching valve 400 may be switched so that the metering device 100 can draw up one of the solvents from solvent reservoirs 14, 16 and then switch back to inject solvent into the system for washing. The metering device 100 can be refilled multiple times for thorough washing. This can be done by assuming a system configuration similar to the one shown in FIG. 3, that is the metering device 100 can be fluidly connected to one of the solvent reservoirs 14, 16. Note, that the thorough washing of the metering device 100 and further system components eliminates sample and gradient carry-over that could otherwise happen due to unwashed areas and/or grooves. The washing of the components and the grooves may be advantageous, as it reduces sample and gradient carry-over. The washing may also be performed simultaneously with equilibration and/or sample analysis. Washing and equilibration may be done by means of the first (left) valve 200 by having the analytical pump 12 fluidly connected with the separation column 4 (i.e., valve 200 may not be switched when equilibrating) and the second (right) valve 400 being iteratively switched for filling and refilling the metering device 100 with solvent (in one position) and the solvent being provided towards the waste reservoir 18 (in another position).

Figure 10:
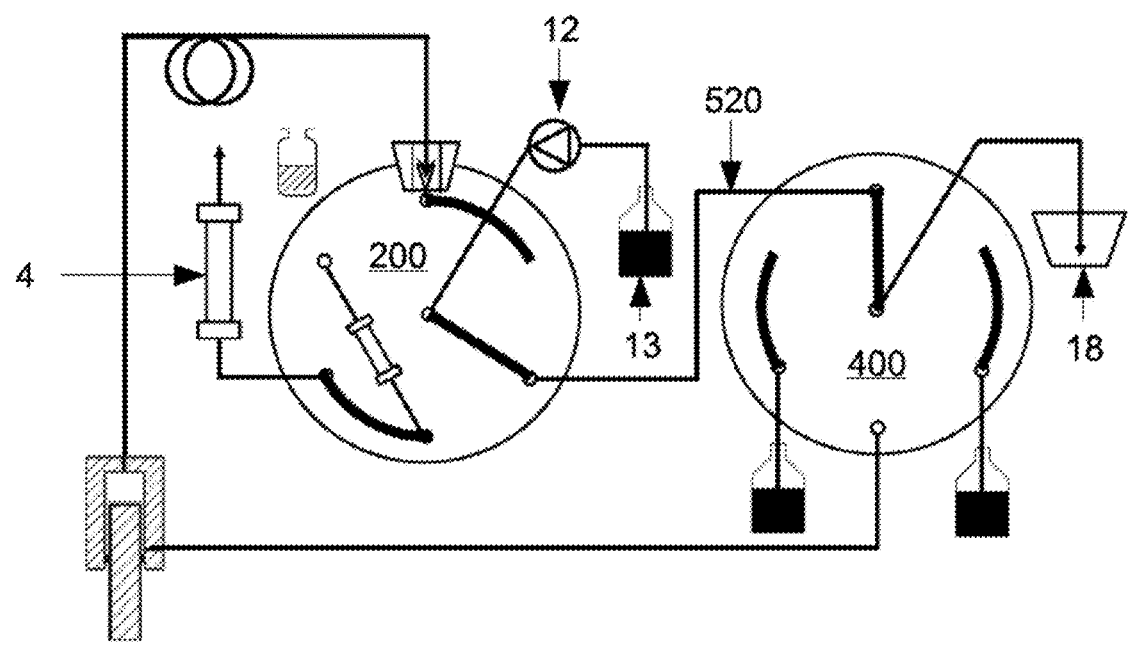
FIG. 10 schematically depicts analytical pump cleaning according to one aspect of the invention.

FIG. 10 schematically depicts analytical pump cleaning according to one aspect of the invention. If the chromatographic method is changed or the pumped solvent from the pump solvent reservoir 13 has to be replaced for other reasons, both valves are interconnected as depicted in FIG. 10. In this position, the analytical pump 12 and the pump solvent reservoir 13 are connected with waste reservoir 18 via tubing 520. The old pump solvent can now be quickly replaced in the intake lines and in the head of the analytical pump 12. The analytical pump 12 can then be washed effectively, using the direct connection to the waste reservoir 18 (without the separation column 4 in the way). The pump solvent or cleaning solution can be selected or switched via a solvent selector valve (not depicted), but it is not required. The pump purge can also be performed with the standard pump solvent.

Figure 11:
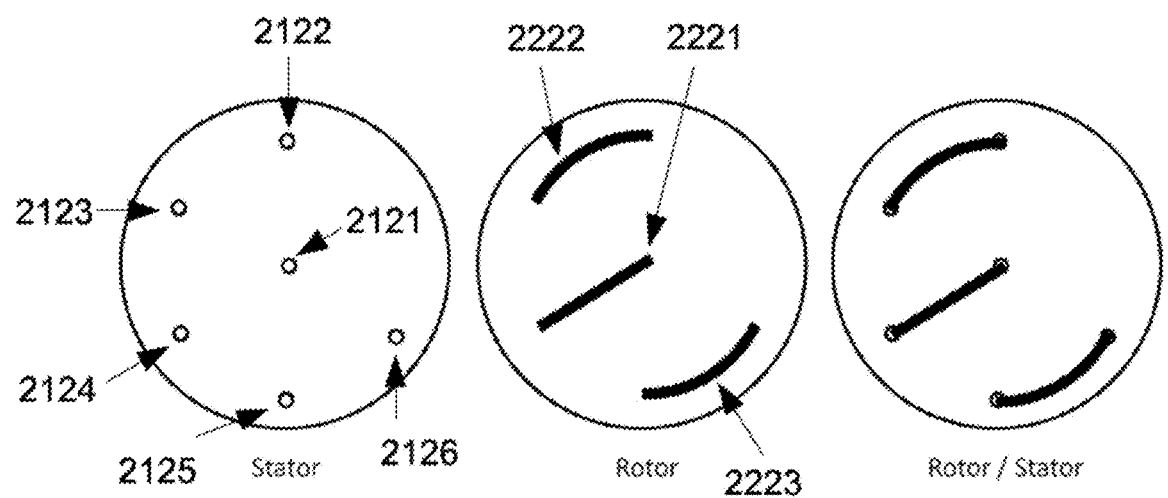
FIG. 11 schematically depicts a switching valve with a port arrangement according to one aspect of the invention.

FIG. 11 schematically depicts a switching valve with a port arrangement according to one aspect of the invention. The central port 2121 is adapted to be fluidly connected with any of the other ports 2122, 2123, 2124, 2125 and 2126. This is possible via the connecting elements or grooves 222. Particularly, the central port 2121 is adapted to be connected to any other port via the central connecting element 2221. The arrangements of the curved connecting elements 2222 and 2223 allows the switching valve 200, 400 to simultaneously connect the central port 2121 with another port and use the other connecting elements for further connection of ports allowing for multiple switching positions.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise. Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

All of the features and/or steps disclosed in the specification can be combined in any combination, except for combinations where at least some of the features and/or steps are mutually exclusive. In particular, preferred features of the invention are applicable to all aspects of the invention and may be used in any combination.

What is claimed is:

1. A liquid chromatography system comprising:
   A) a separation column;
   B) a trap column;
   C) a first switching valve;
   wherein the first switching valve is adapted to include a first switching position to bring a sample into the trap column in a first flow direction;
   wherein the first switching valve is adapted to include a second switching position to fluidly connect the trap column with the separation column and to provide a flow of a fluid from the trap column to the separation column in a second flow direction, in which the second flow direction is opposite to the first flow direction; and
   wherein the first switching valve is adapted to include a third switching position to fluidly connecting the trap column with the separation column and provide a flow of the fluid from the trap column to the separation column in the first flow direction.

2. The system according to claim 1, wherein the first switching valve comprises a plurality of ports and a plurality of connecting elements configured to changeably connect to the plurality of ports of the first switching valve, wherein the plurality of ports include at least a first port, a second port, a third port, and a fourth port and the plurality of connecting elements include at least a first connecting element and a second connecting element, wherein the first port of the first switching valve is adapted to be directly fluidly connected to one of the second port, the third port, and the fourth port of the first switching valve.

3. The system according to claim 2 further comprising:
   D) an analytical pump adapted to generate an analytical flow in the system;
   E) a metering device adapted to bring the sample into the trap column in the first switching position;
   F) a needle adapted to retrieve the sample;
   G) a seat adapted to receive the needle, wherein the first switching position of the first switching valve includes:
      a) the needle located in the seat fluidly connected with the trap column via the second ports, the third port, and the first connecting element; and
      b) the metering device fluidly connected with the needle via a tubing; and
      c) the analytical pump fluidly connected with the separation column via the first port and the fourth port and the second connecting element.

4. The system according to claim 3, wherein the plurality of ports of the first switching valve further includes a fifth port, wherein in the second switching position of the first switching valve,
   the analytical pump is fluidly connected with the trap column via the first port, the fifth port, and the second connecting element; and
   the separation column is fluidly connected with the trap column via the third port, the fourth port, and the first connecting element.

5. The system according to claim 4, wherein in the third switching position of the first switching valve,
   the analytical pump is fluidly connected with the trap column via the first port, the third port, and the second connecting element; and
   the separation column is fluidly connected with the trap column via the fifth port, the fourth port, and the first connecting element.

6. The system according to claim 5 further comprising:
   H) a second switching valve fluidly connected with the first switching valve via a first connecting line and a second connecting line;
   I) a waste reservoir;
   wherein the system is adapted to include a configuration wherein the waste reservoir is fluidly connected with the trap column via the second switching valve and the second connecting line, wherein the first switching valve is further adapted to include a fourth switching position, wherein in the fourth switching position, the analytical pump is fluidly connected with the waste reservoir via the second switching valve and the second connecting line.

7. The system according to claim 6, wherein the second port of the first switching valve is directly fluidly connected to the seat and to the first connecting line;

the third port and the fifth port of the first switching valve are directly fluidly connected to the trap column;

the fourth port of the first switching valve is directly fluidly connected to the separation column;

the first port of the first switching valve is directly fluidly connected to the analytical pump; and wherein the plurality of ports of the first switching valve further includes a sixth port, the sixth port is directly fluidly connected to the second connecting line.

8. The system according to claim 7, wherein the second switching valve comprises a plurality of ports and a plurality of connecting elements configured to changeably connect to the plurality of ports of the second switching valve, wherein the plurality of ports include at least a seventh port, an eighth port, a ninth port, and a tenth port, the seventh port of the second switching valve is directly fluidly connected to the waste reservoir, the eighth port of the second switching valve is directly fluidly connected to the second connecting line, the ninth port of the second switching valve is directly fluidly connected to a first solvent reservoir, and the tenth port of the second switching valve is directly fluidly connected to the first connecting line.

9. The system according to claim 3, wherein the metering device is adapted to pressurize the trap column to a pressure of at least 100 bar.

10. The system according to claim 3, wherein the metering device is adapted to pressurize the trap column to a pressure of at least 1000 bar.

11. The system according to claim 3, wherein the metering device is adapted to pressurize the trap column to a pressure of at least 1500 bar.

12. The system according to claim 3, wherein the metering device is adapted to pressurize the trap column to a pressure ranging from 100 bar to 1500 bar.

13. A method of separating a sample with a liquid chromatography system, the method comprising:

providing a first switching valve including at least three distinct switching positions, a trap column, and a separation column, the at least three distinct switching positions comprise a first switching position, a second switching position, and a third switching position;

switching to the first switching position and then flowing the sample into the trap column in a first flow direction;

switching to the second switching position and then connecting the trap column with the separation column and flowing the sample from the trap column to the separation column in a second flow direction, in which the second flow direction is opposite to the first flow direction; and switching to the third switching position and then connecting the trap column with the separation column and flowing the sample from the trap column to the separation column in the first flow direction.

14. The method according to claim 13, wherein the liquid chromatography system comprises an analytical pump adapted to provide an analytical flow, wherein the method further comprises:

providing a fluid connection between the trap column and the analytical pump, wherein the fluid connection between the trap column and the analytical pump is provided simultaneously with providing a fluid connection between the trap column and the separation column.

15. The method according to claim 14, wherein the liquid chromatography system further comprises a metering device and wherein the metering device pressurizes the trap column.

* * * * *